United States Patent
Rosskamp et al.

(10) Patent No.: US 8,723,453 B2
(45) Date of Patent: May 13, 2014

(54) WORK APPARATUS HAVING AN ELECTRIC DRIVE MOTOR

(75) Inventors: Heiko Rosskamp, Adelberg (DE); Gernot Liebhard, Waiblingen (DE); René Wichert, Durlangen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 52 days.

(21) Appl. No.: 13/269,700

(22) Filed: Oct. 10, 2011

(65) Prior Publication Data
US 2012/0086365 A1    Apr. 12, 2012

(30) Foreign Application Priority Data
Oct. 8, 2010 (DE) .......................... 10 2010 047 761

(51) Int. Cl.
*H02K 7/14*    (2006.01)
(52) U.S. Cl.
USPC .......... 318/17; 318/46; 318/400.22; 318/434; 318/566; 318/635
(58) Field of Classification Search
USPC ......... 318/17, 46, 400.22, 434, 566, 635.154, 318/408, 138, 937
See application file for complete search history.

(56) References Cited

U.S. PATENT DOCUMENTS

| | | | | |
|---|---|---|---|---|
| 3,465,224 A * | 9/1969 | Takeyasu | ................. | 318/400.26 |
| 4,814,675 A * | 3/1989 | Perilhon | ................. | 318/400.22 |
| 5,222,572 A * | 6/1993 | Yamagiwa et al. | ........... | 180/220 |
| 5,680,021 A * | 10/1997 | Hollenbeck | ................. | 318/432 |
| 5,754,019 A * | 5/1998 | Walz | ................. | 318/434 |
| 6,741,803 B2 * | 5/2004 | Osselmann et al. | ......... | 318/434 |
| 7,538,503 B2 * | 5/2009 | Machens et al. | ............ | 318/268 |
| 7,652,438 B2 * | 1/2010 | Rosskamp | ................. | 318/139 |
| 2004/0104695 A1 * | 6/2004 | Hahn et al. | .................... | 318/254 |
| 2005/0052146 A1 * | 3/2005 | Someya | ........................ | 318/434 |
| 2005/0280385 A1 * | 12/2005 | Haller | ........................ | 318/434 |
| 2007/0107973 A1 * | 5/2007 | Jiang et al. | .................... | 180/443 |
| 2011/0129356 A1 * | 6/2011 | Kobayashi et al. | ......... | 417/44.1 |

FOREIGN PATENT DOCUMENTS

DE    10 2007 015 991 A1    10/2007

* cited by examiner

*Primary Examiner* — Eduardo Colon Santana
*Assistant Examiner* — Said Bouziane
(74) *Attorney, Agent, or Firm* — Walter Ottesen P.A.

(57) ABSTRACT

An electric chain saw has an electric drive motor defining a motor-specific characteristic line of the drawn-in current as a function of the rotational speed of the motor. A control unit controls the current flowing through the drive motor below an engaging rotational speed to values below the motor-specific characteristic line. In order to generate an operating point the operator can feel in a working region in a predetermined rotational speed band, a control characteristic line of the electric input power of the electric drive motor as a function of the rotational speed is provided above the engaging rotational speed. The control characteristic line is adapted to reduce the electric input power within the rotational speed band to an approximately even mean power so as to cause the torque of the drive motor to increase within the rotational speed band with falling rotational speed.

42 Claims, 3 Drawing Sheets

WORK APPARATUS HAVING AN ELECTRIC DRIVE MOTOR

CROSS REFERENCE TO RELATED APPLICATION

This application claims priority of German patent application no. 10 2010 047 761.3, filed Oct. 8, 2010, the entire content of which is incorporated herein by reference.

FIELD OF THE INVENTION

The invention relates to a handheld work apparatus having an electric drive motor, in particular to an electric chain saw.

BACKGROUND OF THE INVENTION

U.S. Pat. No. 7,652,438 discloses a handheld work apparatus, for example a chain saw, whose electric drive motor has a motor-specific characteristic line of the drawn-in electric current versus the rotational speed. Electrical power is supplied to the electric drive motor via a control unit. Below a selected minimum rotational speed (engagement speed r), the current flowing through the electric drive motor is limited to values which are below the motor-specific characteristic line. Thus, a general limiting of the current consumption of the electric motor is supposed to be done, in order to achieve effective energy savings which are particularly advantageous during the operation of an electric work apparatus having a battery.

Electric motors generally have a motor current characteristic curve or torque characteristic curve which, at low rotational speeds, exhibit a high current consumption and at high rotational speeds, exhibit a low current consumption or torque. Because a high current consumption leads to a high torque being outputted by the electric motor, an operator, who is guiding the work apparatus having a work tool, achieves increasing cutting power with increasing thrust force. As an answer to an increasing thrust force and a work tool which is slowing (decreasing motor speed), the electric motor outputs a higher torque which is why the operator subjectively perceives a higher cutting power. Because of the typical characteristic curve course of the electric motor, it is difficult for the operator to start and hold a suitable working region with good efficiency by controlling the thrust force.

SUMMARY OF THE INVENTION

It is an object of the invention to provide a work apparatus having an electric drive motor configured so that an operator can start and during operation securely hold a working region with a good efficiency in a simple manner.

The handheld work apparatus of the invention includes: an electric drive motor defining a motor-specific characteristic line of the drawn-in motor current (I) as a function of the rotational speed (n) of the electric drive motor; a control unit for controlling electric energy supplied to the electric drive motor; the control unit being adapted to limit the motor current (I) to values which lie below the motor-specific characteristic line when the rotational speed (n) lies below an engagement rotational speed ($n_E$); the control unit defining a control characteristic line of the electric input power (P) of the electric drive motor as a function of the rotational speed (n) in a work region (A) having a pregiven rotational speed band ($\Delta n$) above the engagement rotational speed ($n_E$); and, the control characteristic line being adapted to reduce the electric input power (P) within the rotational speed band ($\Delta n$) to an approximately even mean power ($P_R$) so as to cause the torque (T) of the electric drive motor to increase within the rotational speed band ($\Delta n$) with falling rotational speed (n).

In a working region above the engagement speed for limiting the motor current, a control characteristic line is defined by the control unit in a predetermined rotational speed band according to which the input power of the electric drive motor is reduced to an approximately identical mean power in the predetermined rotational speed band. The change of the power in the predetermined rotational speed band is configured so that when the rotational speed is dropping in the predetermined rotational speed band, the torque of the drive motor increases.

The configuration of the control characteristic line in this manner leads to a working region which the operator can easily approach. The working region A can be easily approached and held by the operator over a predetermined rotational speed band because of the diametrically opposite behavior of mean power and torque. The configuration of the working region is, thereby, selected so that the electric motor used is operated with a good to optimal efficiency.

In a practical embodiment, the torque characteristic curve of the drive motor is configured in such a manner in the rotational speed band that, when the rotational speed drops, the torque in the relevant working region increases by at least approximately 5%, preferably by at least 15%.

A reduced, approximately identical mean power advantageously approximately corresponds in magnitude to the natural minimum power of the electric drive motor in a selected working region.

For providing a significant working region, it is advantageous when the electrical input power of the electric drive motor drops slightly in the predetermined rotational speed band especially from a maximum value by approximately 15% to 30%, preferably approximately 18%. Thus, a wider, more easily approachable working region having a high electrical efficiency results.

The predetermined rotational speed band lies above a motor rotational speed of approximately 50%, preferably above approximately 60%, of the maximum idle rotational speed of the motor-specific characteristic line of the drive motor. The control characteristic line thus determines a regularly started working region of the electric motor. In particular, the control characteristic line determines a predetermined maximum rotational speed of the drive motor which is below the maximum rotational speed of the motor-specific characteristic line.

In a special embodiment, as an improvement or a standalone solution, a control characteristic line of the electric input power is configured in such a manner that, for example, a cutting power plateau is formed in the power curve of the cutting power of the work tool as a function of the thrust force. The right upper end of the cutting power plateau transitions into a falling back running or receding curve segment when the thrust force increases.

The configuration of the control characteristic line and the thereby targeted influencing of the input power or consumed current of the electric motor is precisely so provided that the cutting power curve forms a cutting power plateau which the operator feels during operation. The cutting power plateau extends over a bandwidth of the thrust force with approximately consistent to slightly changed cutting power.

Advantageously, the cutting power plateau is configured with little slope. The cutting power plateau preferably drops with increasing thrust force. The experienced operator will easily find an operating point on the cutting power plateau because a larger thrust force leads to a significantly dropping cutting power. The operator will consequentially again reduce the thrust force so that the operating point is shifted on the cutting power plateau up to a maximum power in the area of the beginning of the cutting power plateau in the transition to the unchanged cutting power curve. If the operator further increases the thrust force notwithstanding lightly decreasing cutting power, the operating point at the end of the cutting power plateau wanders to the falling curve segment or transitions to a receding curve segment of the adjusted power curve whereby the machine significantly loses cutting power which leads to a corresponding counter reaction by the operator. The receding curve segment has an approximately even gradient as the branch of the curve of the unchanged power curve which slopes upwards to the cutting power plateau. By lowering the thrust force, the operator leads the operating point back onto the cutting power plateau of the cutting curve. The operator can at any time go to one or the other end of the cutting power plateau via the control of the thrust force. In a simple manner, the operator will be led to an operation of the work apparatus in a region of the cutting power plateau because of the predetermined control characteristic line of the control unit, which leads to an optimal cutting power.

A predetermined rotational speed band of the working region of a work tool is in a bandwidth of 500 to 2000 revolutions per minute, preferably around 1000 revolutions per minute. A characteristic line segment, which extends from the upper rotational speed end of the pregiven rotational speed band, drops off steeply toward zero over a narrow rotational speed band of a few hundred revolutions per minute. Preferably, the narrow rotational speed band spans approximately 200 revolutions per minute. The steepness of the characteristic line segment quickly leads to a high torque and a correspondingly high cutting power when cutting is started at maximum rotational speed, so that an operating point in the area of the cutting power plateau can be quickly and reliably started. The output rotational speed to the work tool can be the rotational speed of the electric motor directly driving the work tool or the rotational speed of a gear output shaft which drives the work tool in an adapted manner.

It can be practical to configure the control characteristic line at the upper end of the predetermined rotational speed band in such a manner that the torque curve over a sub-section runs on the motor-specific characteristic line. The control characteristic line has a peak which denotes an optimal operating point with maximum power. This peak is in the area of the upper end of the predetermined rotational speed band at the transition to a curve segment having negative slope.

Furthermore, as a result of the operation of the work tool having an operating point in the region of the cutting power plateau it is ensured that the rotational speed of the drive motor is always in a region which ensures sufficient cooling of the drive motor. Thus, the operator drives the work tool not only in an optimal cutting power range but also in a thermally balanced operating region near the thermal constant power output limit which excludes thermal damaging of the electric drive unit even during constant operation. Advantageously, the consumed electrical input power of the drive motor during constant operation is set to approximately 25% over the input power determined by the thermal constant power output limit.

The electrical efficiency of the drive motor in the working region is advantageously configured so that it is greater than 78% of the maximum efficiency of the electric motor.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
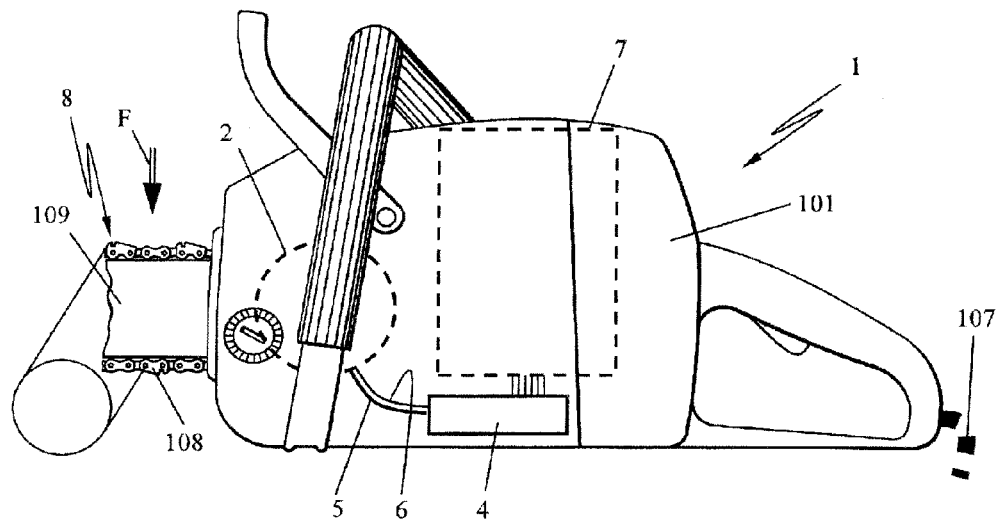
FIG. 1 is a schematic view of a work apparatus having a work tool driven by an electric drive motor, here exemplified by a chain saw.

The invention generally relates to an electric, handheld work apparatus 1 having a driven work tool 8. In FIG. 1, a chain saw 101 is shown as an example of such a work apparatus 1 whose electric drive motor 2 drives the work tool 8—in the embodiment a saw chain 108—with a motor-specific characteristic line 3 (FIG. 2) of the consumed engine current I over the rotational speed n. This motor-specific characteristic line 3 at the same time approximately represents the characteristic course of the torque T outputted by the electric motor 2 over the rotational speed n. Thereby, at maximum idling rotational speed $n_{max}$ the torque T at the output shaft approaches zero, while the current I drops to an assigned idling current. Hereafter, the characteristic line 3 is to approximately represent the motor current I over the rotational speed n as well as the torque T over the rotational speed n. In the embodiment, the characteristic line 3 is shown essentially linearly; other characteristic line courses may be practical.

The portable, handheld work apparatus 1 may also be a hedge trimmer, cut-off machine, brush cutter, edger, pole pruner, sprayer, blower or suction apparatus, auger, combination motor apparatus for multi-functional attachments, sweeper, tiller, cultivator, lawn mower, scarifier, chopper, wet or dry vacuum, olive shaker or similar electric work apparatus 1 having a work tool 8. A work tool 8 driven by an electric drive motor 2 is essential, which in working operation is loaded with a thrust force F by the operator in order to achieve the desired working power. Because of the thrust force F and the power $P_S$ (FIG. 4) rendered at the work tool 8, the rotational speed n of the drive motor 2 drops, which on the motor-specific characteristic line would lead to a greater motor current I and thus to a higher torque T on account of the system.

The electric drive motor 2 of the work apparatus 1 of FIG. 1 is controlled via an electronic control unit 4, for which purpose the electronic control unit 4 is connected to the electric drive motor 2, on the one hand, via energy supplying lines 5 and, on the other hand, via a signal line 6. Control signals and/or the rotational speed n of the electric drive motor 2 are transmitted to the control unit 4 via the signal lines 6. The electric drive motor 2 is preferably a brush-less direct-current motor (EC-Motor) and is electronically commutated via the control unit 4 in a known manner.

In the shown embodiment, the electric energy for operating the drive motor 2 is provided by a battery pack 7 which in the shown embodiment is constructed of lithium-based individual cells having a cell voltage between 2 Volt and 5 Volt. Expediently, Li-ion cells (lithium-ion cells), LiPo cells (lithium-polymer cells), LiFePo4 cells (lithium-iron-phosphate cells), lithium-titanate cells or the like are used in series or in parallel. The battery pack 7 can also be constructed of NiCd cells (nickel-cadmium cells), NiMh cells (Nickel-metal-hydride cells) or the like. Instead of an electrical supply of the drive motor 2 from a battery pack, the electric drive motor 2 can also be fed directly from the electrical supply grid via the control unit 4 and a supply cable 107.

Figure 2:
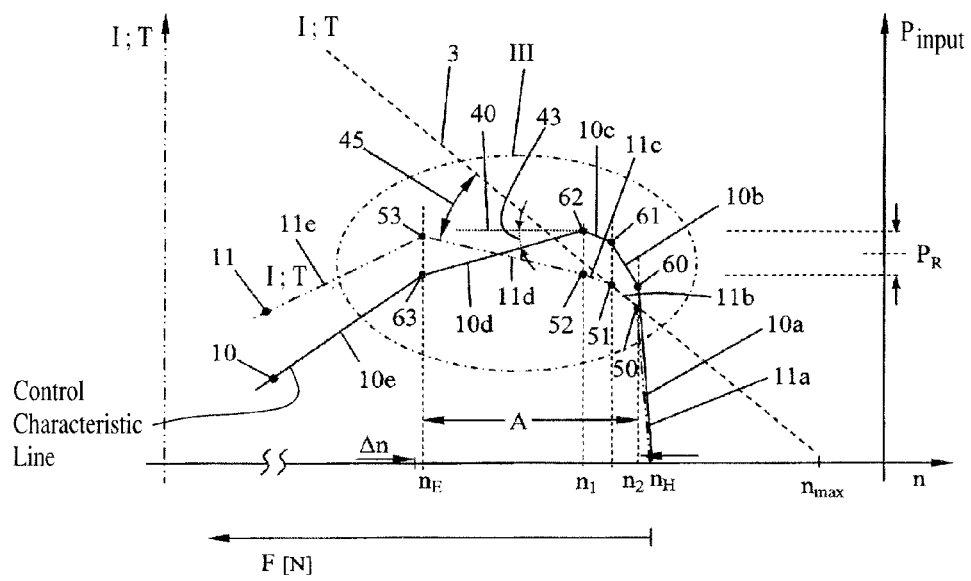
FIG. 2 is a graph showing the course of the electric input power as well as the current/torque course over the rotational speed.

The course of the motor-specific characteristic line 3 in FIG. 2 is characteristic of an electric drive motor 2; at a high rotational speed $n_{max}$ (idle speed) the consumed motor current and/or the outputted torque T of the electric drive motor 2 are low. If the work tool 8 driven by the drive engine 2 is braked—for example by applying a thrust force F—as a result of loading of the driven work tool 8, in the shown embodiment a saw chain 108 circulating on a guide bar 109, the rotational speed n of the driving drive motor 2 decreases, with the result that the consumed motor current I and/or the motor torque T increases. In particular, a cutting tool is provided as the work tool 8, for example, a saw chain 108 driven by a chain wheel in a chain saw, a circular saw blade in a cut-off machine, a cutting blade in a hedge trimmer, and so on.

In order to avoid too large a current increase at low rotational speeds n the current I is reduced deviating from the motor-specific characteristic line 3 by the control unit 4 below an engagement speed $n_E$. Thus, the current I flowing through the electric drive motor 2 is limited to values which are below the motor-specific characteristic line 3. The control of the current I can be achieved by changing the motor supply voltage.

In a working region A (FIGS. 2, 3) above the engaging rotational speed $n_E$, the control unit 4 gives a control characteristic line 10 by which the electrical input power $P_{input}$ of the electric drive motor 2 is reduced in a predetermined rotational speed band Δn to an approximately identical or slightly dropping mean input power $P_R$. In the rotational speed band Δn, the control characteristic line 10 with a characteristic line segment 10*d* is configured such that in the predetermined rotational speed range Δn of the working range A the torque curve 11 increases in a line segment 11*d* above the rotational speed n when the rotational speed n drops. This configuration of the torque curve 11 in the area of the rotational speed band Δn of the working region A is advantageously effected via a change in the motor current I. Thereby, an increase in the torque T by approximately 5% is set within the rotational speed band Δn of the working region A when the rotational speed n decreases. Expediently, the upward slope of the characteristic line segment 11*d* of the torque curve 11 can be selected up to the upward slope of the motor-specific characteristic line 3, thus, over an upward slope range of the angle 45 in FIG. 2, which is between the characteristic line segment lid and the characteristic line 3.

If a downward sloping input power $P_{input}$ of the electric drive motor 2 is provided in the rotational speed band Δn of the working region A, then the configuration is expediently chosen in such a way that the electric input power $P_{input}$ drops from a maximum value by approximately 15% to 30%, preferably approximately 18%. The line segment 10*d* at the control characteristic line 10, which drops downward when the rotational speed n declines, advantageously has a gradient angle 43.

The rotational speed band Δn of the working region A is in the region of the engaging rotational speed $n_E$ up to a maximum rotational speed $n_H$; expediently, the rotational speed band Δn is defined by the rotational speed distance between the engaging rotational speed $n_E$ and a rotational speed $n_2$. The rotational speed $n_2$ is defined by a curve point 60 of the control characteristic line 10 from which point on the control characteristic line starts dropping steeply downward and the torque curve 11 deviates from the motor-specific characteristic line 3 and falls steeply downward toward zero.

The rotational speed band Δn of the working region A is above a motor rotational speed n of approximately 50%, advantageously above 60% of the maximum idle rotational speed $n_{max}$. A rotational speed band of the working region of the driven work tool preferably has a bandwidth of 500 to 2,000 revolutions per minute, in particular, 1000 revolutions per minute. The rotational speed is thereby expediently related to the work tool 8, that is, for example to a chain wheel driving the saw chain 108 or the shaft of a cut-off machine carrying a circular saw blade. The control characteristic line 10 and/or the torque curve T is configured in such a manner that a maximum rotational speed $n_H$ of the drive motor 2 is limited to a value below the maximum rotational speed $n_{max}$ of the motor-specific characteristic line 3. Starting from this maximum rotational speed $n_H$ of the drive motor 2 the control characteristic line 10 is configured so that the torque T (motor current I) has a first characteristic line segment 11*a* which runs steeply upward up to a curve point 50 on the motor-specific characteristic line 3. The upward slope of the line segment 11*a* is formed over a narrow rotational speed bandwidth $n_H$-$n_2$ of a few hundred revolutions per minute; preferably the rotational speed bandwidth $n_H$-$n_2$ extends over 200 to 300 revolutions per minute. Coming from a low rotational speed n the characteristic line segment 11*a* drops steeply toward zero to a minimum value.

Coming from the steep characteristic line segment 11*a*, the torque curve 11 extends from curve point 50 on the motor-specific characteristic line 3 to a curve point 51 in order to then extend with little upward slope from the characteristic line 3, deviating to a curve point 52 in the rotational speed band Δn of the working region A.

Correspondingly, when the rotational speed n is dropping, the control characteristic line 10 of the electrical input power $P_{input}$ runs steeply upwards from a minimal input power along a line segment 10*a* to a curve point 60 above the curve point 50 of the torque curve T. The line segment 10*b* of the control characteristic line 10, which continues at small upward slope, ensures that the torque curve T, in a line segment 11*b*, runs on the characteristic line 3 in order to then, starting at the curve point 61, compel a deviation of the torque curve T in the characteristic line segment 11*c* below the characteristic line 3 because of the input power $P_{input}$ reduced further along the characteristic line segment 10*c*. The line segment 10*c* slopes upward up to a curve point 62 of maximum input power $P_{input}$ and then stays approximately constant (dotted line 40) along the line segment 10*d* according to the given control characteristic line 10 or drops off to a minimum value of 63. The configuration is chosen in such a way that the increases to a maximum value 53 along the line segment 11*d* notwithstanding the constant or dropping input power $P_{input}$ within the rotational speed band Δn of the working region A. Notwithstanding a dropping input power $P_{input}$, the increase of the torque T results through the dropping rotational speed n. For controlling the input power $P_{input}$, the control unit 4 reduces the current I only moderately, so that the operator does not notice any substantial power reduction in the working region A (engaging rotational speed $n_E$). At the bottom end of the rotational speed band Δn of the working region A, a simple current limiting occurs so that the torque T (or the current I) and the power $P_{input}$ follow the respective downward sloping line segments 10*e* and 11*e*.

Figure 3:
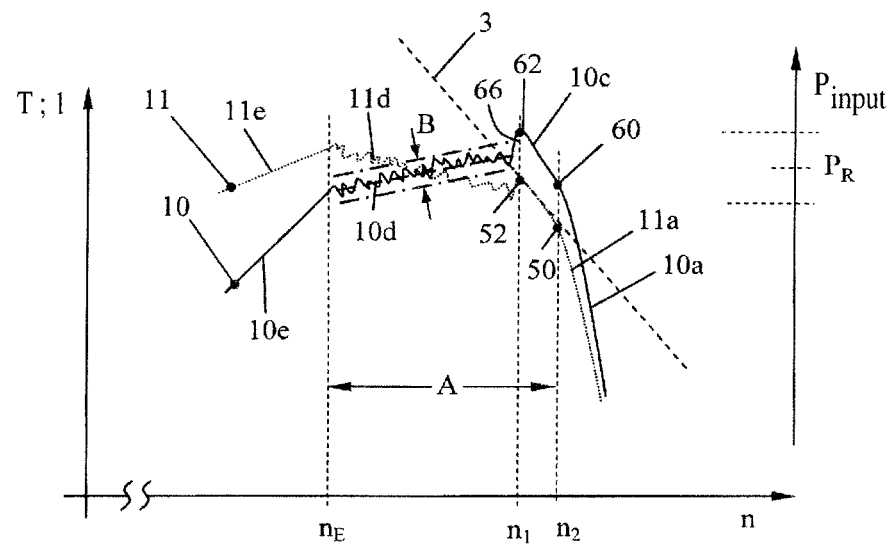
FIG. 3 is an enlarged view of detail III of the graph from FIG. 2.

In FIG. 3 the rotational band Δn of the working region A is shown in detail in the respective transitions. Like reference characters designate like line segments and curve points. As can be seen from the course of the control characteristic line 10 of the input power $P_{input}$ over the rotational speed n, the characteristic line segment 10c transitions into the line segment 10d in the rotational speed band Δn with a peak 66 which forms the maximum of the input power $P_{input}$ (curve point 62). In the region of the predetermined rotational speed band Δn, the line segment 10d of the control characteristic line 10 is configured in such a manner that an approximately constant or slightly fluctuating mean power $P_R$ is set over the rotational speed band Δn. Thereby, fluctuation of the input power about the mean power $P_R$ of ±15% can be permitted, preferably of less than ±10%. Thus, a bandwidth B of the mean power $P_R$ results. If the line segment 10d of the control characteristic line 10 is configured to slope downward, then, when the rotational speed n is dropping, the mean consumed electrical power drops from a maximum value at the curve point 62 to a minimum value at curve point 63. In this connection, the input power $P_{input}$ in the curve point 63 is approximately 80% to 95% of the input power $P_{input}$ at the curve point 62.

Figure 4:
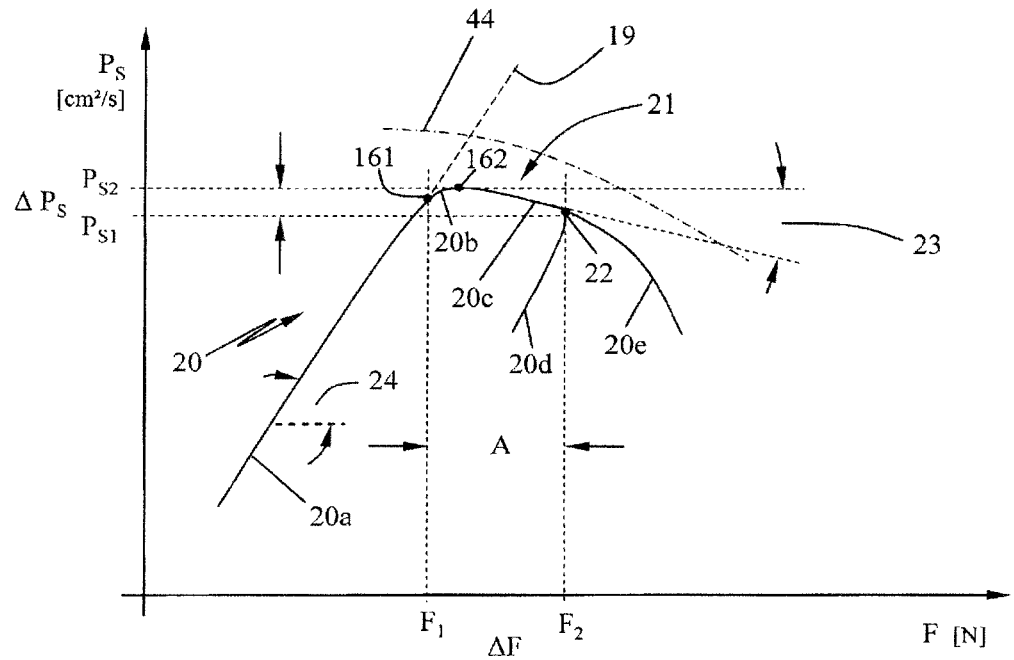
FIG. 4 is a cutting power diagram of an electrically driven work tool, here exemplified by a saw chain of a chain saw.

The control characteristic line 10 configured in this manner leads to a special form of the power curve 20 of the cutting power $P_S$ over the thrust force F, as is shown in FIG. 4. The cutting power curve 20 of a work tool 8 driven by an electric motor 2 would theoretically consistently increase along the dotted characteristic line 19. The cutting power $P_S$, thereby, consistently increases with increasing thrust force F. A noticeable working region cannot be determined by the operator.

As a result of the configuration of the control characteristic line 10 according to FIGS. 2 and 3 in the rotational speed band Δn of the working region A, the cutting power curve 20 is changed in such a manner that a cutting power plateau 21, whose one end 22 transitions into a downward sloping line segment 20e when the thrust force increases, is formed above the thrust force F. It can be advantageous to configure the downward sloping line segment 20e as a receding line segment 20d.

The line segments 20b and 20c of the configured cutting power curve 20 approximately define the cutting power plateau 21 of the working region A, which can be noticeably approached and easily held by the operator though the application of the thrust force F.

If the work apparatus 1, for example, a chain saw 101, is taken into operation, the work tool 8, that is, the saw chain 108, initially runs with a maximum rotational speed $n_H$ predetermined by the control characteristic line 10. With load being applied to the driven work tool 8 by the application of a thrust force F, the electrical input power $P_{input}$ slopes steeply upward because of the steep characteristic line segment 10a; this corresponds to the upward sloping cutting power in the upward sloping curve branch 20a of the unchanged cutting power curve 20 (FIG. 4). With a further increase of the thrust force F the rotational speed further drops from $n_2$ to $n_1$, whereby the control characteristic line 10 runs through the characteristic line segments 10b and 10c, whereby the torque curve 11 initially lies on the motor-specific characteristic line 3. In the area of the rotational speed $n_1$ the maximum input power $P_{input}$ (Peak 66) is achieved; the cutting power curve 20 has achieved the maximum cutting power $P_{S2}$ at point 162. The first inflection point 161 of the cutting power curve 20 from line segment 20a to line segment 20b upwards to point 162 of the maximum cutting power $P_{S2}$ (Peak 66) corresponds to the curve point 62 of the input power $P_{input}$ in the graph according to FIG. 2. In the graph according to FIG. 2, with increasing thrust force F to $F_2$, the consumed electrical input power $P_{input}$ decreases over the decreasing rotational speed $n_1$ to $n_E$—or remains constant corresponding to the dotted line 40—, while the rotational speed n drops off. Because of the dropping rotational speed n and the moderate reduction of the electrical input power $P_{input}$ in the rotational speed band Δn, the torque T of the motor 2 increases at the same time over the dropping rotational speed n through which the cutting power plateau 21 is formed in the cutting power diagram (FIG. 4). In the region of the cutting power plateau 21, the cutting power $P_S$ changes only within a narrow bandwidth $\Delta P_S$. The cutting power plateau 21 drops off with a small angle 23 of a few degrees.

If the operator increases the thrust force F further (FIG. 2) so that the rotational speed n falls below the engaging rotational speed $n_E$, the control characteristic line 10 slopes steeply downward in the curve branch 10e, due to which the torque T outputted by the electric motor 2 also drops. In the cutting power diagram (FIG. 4), the operating point wanders to the downward sloping line segment 20e or the receding line segment 20d, which the operator notices because of a strong drop of the cutting power $P_S$. With the reduction of the thrust force F, the operating point shifts back into the area of the cutting power plateau 21 at optimal cutting power $P_S$. This corresponds to an operation in the rotational speed band 1n of the working region A (FIG. 2).

With a chain saw, a first cut is begun with maximum rotational speed $n_H$ and then the thrust force F is increased. With increasing thrust force, the operating point of the chain saw runs over the upward sloping curve branch 20a of the cutting power plateau 21 (FIG. 4) up to a maximum cutting power $P_{S2}$. At the point 162, the highest cutting power $P_S$ is reached at the highest point of the cutting power plateau 21. If the thrust force F is increased further from $F_1$ to $F_2$ the operating point moves in the working region A in the area of the cutting power plateau 21. If a thrust force F is applied which is substantially larger than the maximum thrust force $F_2$ at the end of the cutting power plateau 21, the operating point extends into the downward sloping line segment 20e or 20d with strongly reducing cutting power $P_S$. The receding line segment 20d has approximately the same upward slope as the curve branch 20a of the cutting power curve 20 sloping upwards to the cutting power plateau 21.

The cutting power plateau 21 is preferably configured with little slope 23, whereby the slope 23 is selected in such a manner that it drops with increasing thrust force F. This has the result that when increasing the thrust force, the operator will notice a substantial drop in the cutting power $P_S$ at the transition point to the downward sloping line segment and thus may sense or feel the end of the work region in the area of the end 22 of the line segment 20c. If the operator reduces the thrust force F, the cutting power on the cutting power plateau 21 again increases up to the maximum point 162 so that the operator can operate the work apparatus in an optimal working region A in a simple manner by choosing the thrust force F.

The configuration of the control characteristic line 10 according to FIGS. 2 and 3 determines the formation of the cutting power curve 20 according to FIG. 4. A cutting power curve configured in such a manner does not result when driving a work tool, in particular, a cutting tool when driven by an electric drive motor 2 on a motor-specific characteristic line.

The configuration of the control characteristic line 10 is done in such a manner that in the working region A the rotational speed of the electric motor lies in a region which ensures sufficient cooling of the electric drive motor 2 even under load. The configuration of the cutting power curve according to FIG. 4 encourages the operator to choose the operating point in the area of the cutting power plateau 21 in order to achieve a maximum cutting power $P_S$, which ensures a rotational speed in the area between $n_E$ and $n_2$ (FIG. 2) at which thermal overloading of the electric drive motor can safely be excluded. The formed cutting power plateau 21 is below a constant power limit 44 of a thermal overload range.

The control unit 4 compels the control characteristic line 10 according to the invention. In the working region A, the line segment sloping downward at dropping rotational speed n is brought back to a mean engaging power P between $n_1$ and $n_E$.

Figure 5:
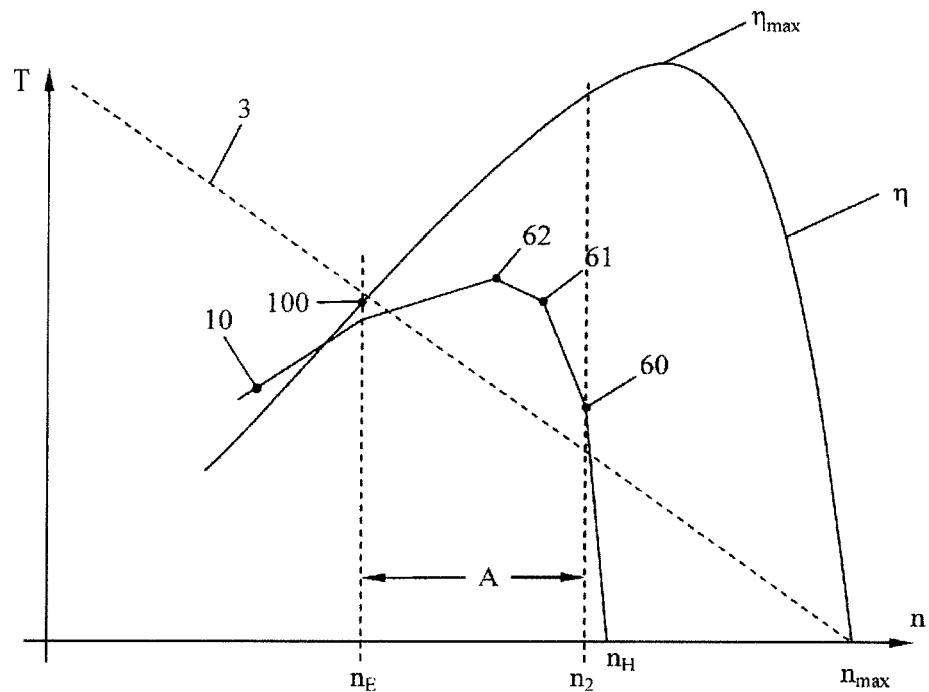
FIG. 5 is a graph of the efficiency of the electric motor over the rotational speed; and, FIG. 6 is a power curve of the mechanical power outputted at the work tool over the rotational speed.

FIG. 5 shows the efficiency $\eta$ which increases over the rotational speed n to a maximum $\eta_{max}$ to then decrease to a torque T toward zero at a maximum rotational speed $n_{max}$.

FIG. 5 shows the control characteristic line 10 with the curve points 60, 61 and 62. The working region A lies between the engaging rotational speed $n_E$ and an upper rotational speed $n_2$. The rotational speed band $\Delta n$ of the working region A is defined by the difference between the upper rotational speed $n_2$ and the engaging rotational speed $n_E$, thus $n_2 - n_E$.

In the area of the engaging rotational speed $n_E$, the motor efficiency at point 100 is approximately 75% to 78% of the maximum efficiency $\eta_{max}$ and increases in the working region A with increasing rotational speed. The increase in the efficiency $\eta$ within the working region A is possible up to close to the maximum efficiency $\eta_{max}$; expediently, an efficiency $\eta$ of up to 95% of the maximum efficiency $\eta_{max}$ is achieved in the working region A.

Figure 6:
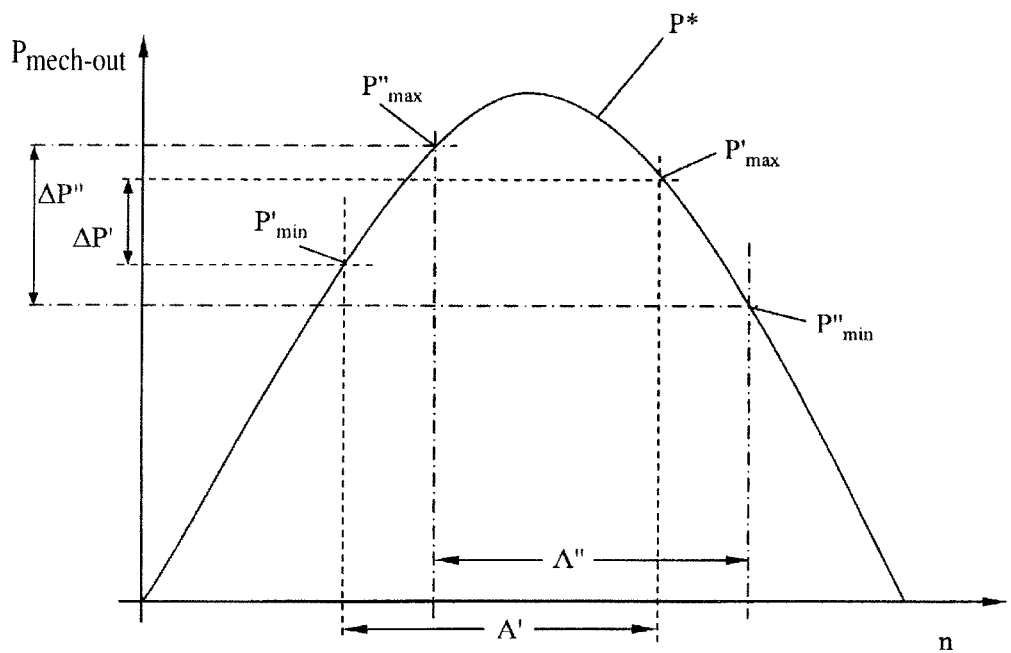

In the embodiment according to FIG. 6, a power curve P* is schematically shown. In this power curve P*, for example, a working region A' or A" is chosen. Each working region is characterized by a minimum power ($P'_{min}$, $P''_{min}$) and a maximum power ($P'_{max}$, $P''_{max}$), respectively.

If the control characteristic line 10 (FIG. 2) is set to an approximately even mean power $P_R$ in the working region A then this even mean power $P_R$ is chosen so that it corresponds to the natural minimum power of the natural power curve P*. This means that in a working region A', the mean power $P_R$ to be set corresponds to the minimum power $P'_{min}$ of the natural power curve P*; if a working region A" is selected, the same mean power $P_R$ to be set is defined as the minimum power $P''_{min}$ of the working region A". Depending on the position of the working region the minimum power $P_{min}$ can lie on the upward sloping as well as on the downward sloping curve branch of the natural power curve P*.

According to the invention, the drive motor 2 drives a work tool, in particular, a cutting tool. If the work apparatus 1 is configured as a chain saw the cutting tool is a saw chain. The electric drive motor 2 of the work apparatus is generally supplied by a battery pack that is supplied with electrical energy.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
an electric drive motor defining a motor-specific characteristic line of the drawn-in motor current (I) as a function of the rotational speed (n) of said electric drive motor;
a control unit for controlling electric energy supplied to said electric drive motor;
said control unit being adapted to limit said motor current (I) to values which lie below said motor-specific characteristic line when said rotational speed (n) lies below an engagement rotational speed ($n_E$);
said control unit defining a control characteristic line of the electric input power (P) of said electric drive motor as a function of said rotational speed (n) in a work region (A) having a pregiven rotational speed band ($\Delta n$) above said engagement rotational speed ($n_E$);
said control characteristic line being adapted to reduce said electric input power (P) within said rotational speed band ($\Delta n$) to an approximately even mean power ($P_R$) so as to cause the torque (T) of said electric drive motor to increase within said rotational speed band ($\Delta n$) with falling rotational speed (n); and,
wherein said electric input power (P) drops in said pregiven rotational speed band ($\Delta n$) over a segment of said control characteristic line for a falling rotational speed (n).

2. The work apparatus of claim 1, wherein said torque (T) of said electric drive motor increases by approximately 5% in said rotational speed band ($\Delta n$) with falling rotational speed (n).

3. The work apparatus of claim 1, wherein said torque (T) of said electric drive motor increases by up to 15% in said rotational speed band ($\Delta n$) with falling rotational speed (n).

4. The work apparatus of claim 1, wherein the reduced approximately even mean power ($P_R$) corresponds approximately to the natural minimum power ($P'_{min}$, $P''_{min}$) of said electric drive motor in a selected work region (A', A").

5. The work apparatus of claim 1, wherein said electric input power (P) drops by 15% to 30% starting from a maximum value thereof.

6. The work apparatus of claim 1, wherein said electric input power (P) drops by approximately 18% starting from a maximum value thereof.

7. The work apparatus of claim 1, wherein said pregiven rotational speed band ($\Delta n$) lies above a motor rotational speed (n) of approximately 50% of the maximum idle rotational speed ($n_{max}$) of said motor-specific characteristic line of said electric drive motor.

8. The work apparatus of claim 1, wherein said pregiven rotational speed band ($\Delta n$) lies above a motor rotational speed (n) of approximately 60% of the maximum idle rotational speed ($n_{max}$) of said motor-specific characteristic line of said electric drive motor.

9. The work apparatus of claim 1, wherein said control characteristic line limits the highest rotational speed ($n_H$) of said electric drive motor to a value below the maximum rotational speed ($n_{max}$) of said motor-specific characteristic line.

10. The work apparatus of claim 1, wherein said work apparatus includes a work tool driven by said electric drive motor; and, said electric drive motor has an output rotational speed in said work region (A) to said work tool lying in a bandwidth of approximately 500 rpm to 2000 rpm.

11. The work apparatus of claim 10, wherein said output rotational speed to said work tool lies in a bandwidth around 1000 rpm.

12. The work apparatus of claim 1, wherein the electric input power (P) of said electric drive motor is adjusted to be close to a thermal continuous power limit in said pregiven rotational speed band ($\Delta n$).

13. The work apparatus of claim 12, wherein the electric input power (P) of said electric drive motor drawn in during continuous operation is adjusted to be approximately 25% above the input power determined by said thermal continuous power limit.

14. The work apparatus of claim 1, wherein the electric efficiency ($\eta$) of said electric drive motor is greater than 75% of the maximum efficiency ($\eta_{max}$) in said work region (A).

15. The work apparatus of claim 1, wherein said work apparatus includes a work tool driven by said electric drive motor; and, said work tool is a cutting work tool.

16. The work apparatus of claim 15, wherein said cutting work tool is a saw chain.

17. The work apparatus of claim 1, further comprising a battery pack for supplying said electric drive motor.

18. A handheld work apparatus comprising:
an electric drive motor defining a motor-specific characteristic line of the drawn-in motor current (I) as a function of the rotational speed (n) of said electric drive motor;
a control unit for controlling electric energy supplied to said electric drive motor;
said control unit being adapted to limit said motor current (I) to values which lie below said motor-specific characteristic line when said rotational speed (n) lies below an engagement rotational speed ($n_E$);
said control unit defining a control characteristic line of the electric input power (P) of said electric drive motor as a function of said rotational speed (n) in a work region (A) having a pregiven rotational speed band ($\Delta n$) above said engagement rotational speed ($n_E$);
said control characteristic line being adapted to reduce said electric input power (P) within said rotational speed band ($\Delta n$) to an approximately even mean power ($P_R$) so as to cause the torque (T) of said electric drive motor to increase within said rotational speed band ($\Delta n$) with falling rotational speed (n); and,
wherein said control characteristic line includes a first characteristic line segment wherein said rotational speed (n) drops off toward zero over a narrow rotational speed bandwidth ($n_H$–$n_2$) of a hundred rpm.

19. The work apparatus of claim 18, wherein said rotational speed bandwidth ($n_H$–$n_2$) is 200 rpm.

20. The work apparatus of claim 18, wherein said control characteristic line includes a second characteristic line segment having an ascending slope so as to cause a torque curve to have a torque curve segment which runs on said motor-specific characteristic line.

21. The work apparatus of claim 20, wherein the transition of said control characteristic line into a falling segment thereof occurs in the region of the right, upper end of said pregiven rotational speed band ($\Delta n$); and, said transition defines a peak of highest power in said region.

22. A handheld work apparatus comprising:
an electric drive motor defining a motor-specific characteristic line of the drawn-in motor current (I) as a function of the rotational speed (n) of said electric drive motor;
a control unit for controlling electric energy supplied to said electric drive motor;
said control unit being adapted to limit said motor current (I) to values which lie below said motor-specific characteristic line when said rotational speed (n) lies below an engagement rotational speed ($n_E$);
said control unit defining a control characteristic line of the electric input power (P) of said electric drive motor as a function of said rotational speed (n) in a work region (A) having a pregiven rotational speed band ($\Delta n$) above said engagement rotational speed ($n_E$);
said control characteristic line being adapted to reduce said electric input power (P) within said rotational speed band ($\Delta n$) to an approximately even mean power ($P_R$) so as to cause the torque (T) of said electric drive motor to increase within said rotational speed band ($\Delta n$) with falling rotational speed (n); and,
wherein the input power (P) fluctuates about the mean power ($P_R$) by ±15%.

23. The work apparatus of claim 22, wherein the input power (P) fluctuates about the mean power ($P_R$) by less than ±10%.

24. A handheld work apparatus comprising:
an electric drive motor defining a motor-specific characteristic line of the drawn-in motor current (I) as a function of the rotational speed (n) of said electric drive motor;
a work tool driven by said electric drive motor;
a control unit for controlling electric energy supplied to said electric drive motor;
said control unit being adapted to limit said motor current (I) to values which lie below said motor-specific characteristic line when said rotational speed (n) lies below an engagement rotational speed ($n_E$);
said control unit defining a pregiven control characteristic line of the electric input power (P) of said electric drive motor;
said pregiven control characteristic line being configured so as to cause a cutting power plateau to be formed in a power curve of the cutting power ($P_S$) of said work tool as a function of the thrust force (F) with said cutting power plateau having a right upper end which transitions into a first curve segment falling off with increasing thrust force (F).

25. The work apparatus of claim 24, wherein said first curve segment runs back with increasing thrust force (F).

26. The work apparatus of claim 25, wherein said first curve segment defines an approximately even slope in the same manner as a second curve segment rising to said cutting power plateau.

27. The work apparatus of claim 24, wherein said cutting power plateau is configured to have a slight slope.

28. The work apparatus of claim 27, wherein said slight slope is a negative slope with increasing thrust force (F).

29. The work apparatus of claim 24, wherein said electric drive motor has an output rotational speed in a work region (A) to said work tool lying in a bandwidth of approximately 500 rpm to 2000 rpm.

30. The work apparatus of claim 29, wherein said output rotational speed to said work tool lies in a bandwidth around 1000 rpm.

31. The work apparatus of claim 24, wherein said control characteristic line includes a first characteristic line segment wherein said rotational speed (n) drops off toward zero over a narrow rotational speed bandwidth ($n_H$–$n_2$) of a few hundred rpm.

32. The work apparatus of claim 31, wherein said rotational speed bandwidth ($n_H$–$n_2$) is 200 rpm.

33. The work apparatus of claim 31, wherein said control characteristic line includes a second characteristic line segment having an ascending slope so as to cause a torque curve to have a torque curve segment which runs on said motor-specific characteristic line.

34. The work apparatus of claim 33, wherein said control unit defines said control characteristic line as a function of said rotational speed (n) in a work region (A) having a pregiven rotational speed band ($\Delta n$) above said engagement rotational speed ($n_E$); and, wherein the transition of said control characteristic line into a falling segment thereof occurs in the region of the right, upper end of said pregiven rotational speed band ($\Delta n$); and, said transition defines a peak of highest power in said region.

35. The work apparatus of claim 24, wherein said control unit defines said control characteristic line as a function of said rotational speed (n) in a work region (A) having a pregiven rotational speed band ($\Delta n$) above said engagement rotational speed ($n_E$); and, wherein said electric input power (P) of said electric drive motor is adjusted to be close to a thermal continuous power limit in said pregiven rotational speed band ($\Delta n$).

36. The work apparatus of claim 35, wherein said electric input power (P) of said electric drive motor drawn in during continuous operation is adjusted to be approximately 25% above the input power determined by said thermal continuous power limit.

37. The work apparatus of claim 24, wherein the electric efficiency ($\eta$) of said electric drive motor is greater than 75% of the maximum efficiency ($\eta_{max}$) in said work region (A).

38. The work apparatus of claim 24, wherein the input power (P) fluctuates about the mean power ($P_R$) by ±15%.

39. The work apparatus of claim 38, wherein the input power (P) fluctuates about the mean power ($P_R$) by less than ±10%.

40. The work apparatus of claim 24, wherein said work apparatus includes a work tool driven by said electric drive motor; and, said work tool is a cutting work tool.

41. The work apparatus of claim 40, wherein said cutting work tool is a saw chain.

42. The work apparatus of claim 24, further comprising a battery pack for supplying said electric drive motor.

* * * * *

UNITED STATES PATENT AND TRADEMARK OFFICE
CERTIFICATE OF CORRECTION

PATENT NO.         : 8,723,453 B2
APPLICATION NO.    : 13/269700
DATED              : May 13, 2014
INVENTOR(S)        : Heiko Rosskamp et al.

It is certified that error appears in the above-identified patent and that said Letters Patent is hereby corrected as shown below:

In the Specification

In column 1:
Line 23: delete "r)," and substitute -- $n_E$), -- therefor.

In column 5:
Line 11: delete "rent" and substitute -- rent I -- therefor.
Line 50: delete "lid" and substitute -- 11d -- therefor.

In column 6:
Line 51: add -- torque T -- after "the".

In column 8:
Line 23: delete "1n" and substitute -- $\Delta n$ -- therefor.

Signed and Sealed this
Twenty-ninth Day of July, 2014

Michelle K. Lee
*Deputy Director of the United States Patent and Trademark Office*